Sept. 10, 1929.  A. D. SUMNER  1,727,796
SLITTER CUTTER
Filed Oct. 20, 1928
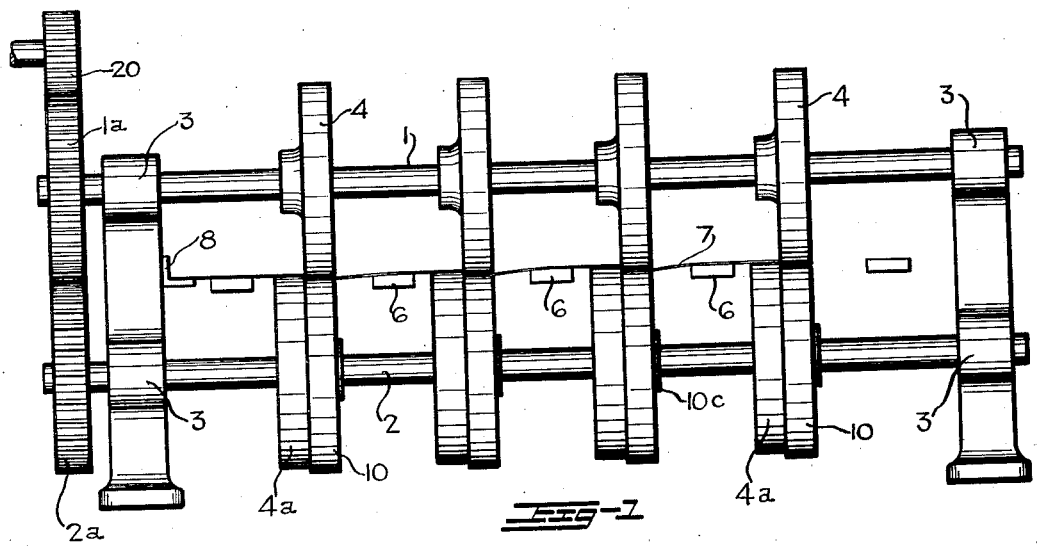
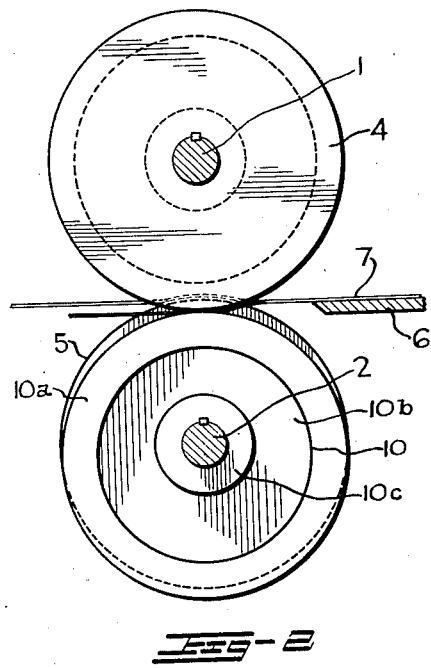
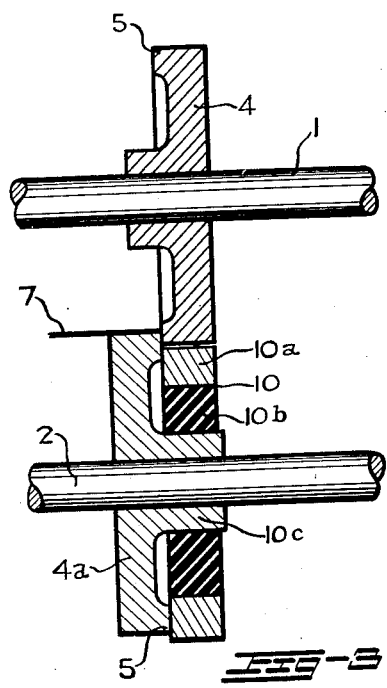
INVENTOR
ARTHUR D. SUMNER
BY Cook & Robinson
ATTORNEY Patented Sept. 10, 1929.

1,727,796

UNITED STATES PATENT OFFICE.

ARTHUR D. SUMNER, OF LOS ANGELES, CALIFORNIA, ASSIGNOR TO CONTINENTAL CAN COMPANY, INC., OF NEW YORK, N. Y., A CORPORATION OF NEW YORK.

SLITTER CUTTER.

Application filed October 20, 1928. Serial No. 313,843.

This invention relates to improvements in slitter cutters as used for the cutting of sheets of tin into strips, and more particularly to cutters of that character wherein the cutting or slitting results from the shearing action of the slightly overlapped edges of two revolving rollers between which the piece to be slit is passed.

In slitter cutters of this type, not equipped with the present improvement, difficulty is experienced when the slit or cut is made close to the edge of a sheet of metal, this being due to the fact that an unsupported part of the sheet will bend down between the rollers instead of being sheared off. Therefore, it has been the principal object of this invention to provide a means for overcoming this undesirable result.

More specifically, the present invention resides in the placing of what may be termed a strip supporting and feed roller closely adjacent the face of one of the shearing rollers and in such alinement with the other shearing roller as to support the cut sheet of metal along one side of the cut; this added roller being of substantially the same diameter as the roller adjacent which it is mounted and adapted to revolve therewith, and comprising a metal rim with a rubber or other resilient supporting body intermediate the rim and hub of the roller whereby the rim will at all times be pressed tightly against the narrow strip being cut from the sheet.

Other objects of the invention reside in the various details of construction and in the combination of parts as is hereinafter described.

In accomplishing these objects of the invention, I have provided the improved details of construction, the preferred forms of which are illustrated in the accompanying drawings, wherein—

Figure 1 is a front view of a slitter cutter with which the present invention is embodied.

Figure 2 is a vertical section in a plane at right angles to the shafts of the cutting rollers, showing the overlapped relation of the rollers and the relative position of the strip supporting and feed roller.

Figure 3 is an enlarged, sectional view of one set of shearing rollers with which there is associated a strip supporting and feed roller in accordance with the present invention.

Referring more in detail to the drawings—

1 and 2 designate parallel shafts mounted revolubly in supporting bearings 3 and equipped, respectively, with a plurality of cooperatively arranged rollers 4 and 4ª with square cut peripheral edges 5; the rollers of one shaft being arranged to slightly overlap corresponding rollers of the other shaft in rubbing contact so as to produce the desired shearing action on sheets of metal which may be passed between them. At one side of the machine the shafts are equipped with intermeshing gears 1ª and 2ª whereby they are caused to rotate together in opposite directions, and a driving gear 20 meshes with gear 1ª to drive the shafts.

In the present drawing, I have illustrated no special means whereby the sheets of metal are passed to the cutting rollers and it is to be understood that this could be done by hand or by any suitable device which would operate for this purpose. In Figures 1 and 2, I have shown a series of bars 6 over which a sheet 7 of metal, such as tin, is being passed to the rollers for cutting, and 8 designates a gauge strip against which one edge of the sheet is placed to properly aline it for cutting.

As was previously stated, difficulty is usually experienced in machines not equipped with the present improvement when a cut is made quite close to the edge of the sheet, for the reason that since a narrow strip will have no support close to the cutter it will have the natural tendency to bend down between the shearing surfaces of the rollers to be either not cut off at all or to be shaved off in such manner as to leave a ragged, uneven edge. To avoid this undesirable result, I have assembled with the rollers 4ª of the lower shaft and adjacent their side surfaces, the additional rollers 10 which I have designated as the strip supporting and feed rollers. These rollers have ring-like rim portions 10ª, preferably of hardened steel, and which are of the same diameters as the rollers against which they are disposed and which have peripheral rolling contact with the rollers 4 on the upper shaft when sheets of metal are not passing between them. These rings 10ª are mounted on rubber bushings 10ᵇ which form the body portions of rollers and which, in turn, are mounted on hubs 10ᶜ which may be integral with or separate from the rollers 4ª, but in either event, are fixed so as to revolve with the shaft 2. The bushings 10ᵇ are of such character that, if it were not for the overlapped relation of rollers 4 and 4ª, they would hold the rings 10ª concentric with the rollers 4ª, but their resiliency permits the ring-like rims 10ª to be pressed downwardly to the eccentric relation with respect to rollers 4ª in which they operate. This resiliency of the bushings also causes the rims 10ª to bear upwardly toward rollers 4 so as to cooperate therewith for the purposes intended.

With the parts so arranged, it is readily apparent that the sheets 7 of metal passed through the machine are taken up by the paired rollers and are cut in strips by virtue of the shearing action of their overlapped edges. It is also apparent that should a sheet of metal being cut into strips extend only slightly beyond one of the underlying disks 4ª, as in Figure 3, the narrow strip that will be cut off will be so held between the roller 10 and the roller 4 as to be sheared off instead of its being permitted to bend down between the rollers.

It is further apparent that the rubber bushings 10ᵇ which support the metal rims of the rollers 10 will cause the rims to be pressed tightly against the strips, and since the rollers 10 are being driven with the shearing rollers, they will serve additionally as means of feeding the sheets of metal through the machine.

While I have shown the lower disks only equipped with these rollers 10, it is readily apparent that both upper and lower sets could be so equipped, but this, in most instances, is not necessary.

Applicant is aware of the fact that heretofore rubber, or fiber, feed rollers have been associated with shearing rollers of this character, but they were not intended to and did not serve the present purpose, but only served as feed rollers. Their resiliency prevented their operating to overcome bending down of the narrow strips between the shearing rollers. In the present instance, the metal rims 10ª supported by the resilient bushings do not wear away and they serve satisfactorily for the purpose intended.

Having thus described my invention, what I claim as new therein and desire to secure by Letters Patent, is:

1. In a machine of the character described, a pair of rotatable, overlapped shearing rollers arranged for slitting sheets of metal fed thereto and a strip supporting and feed roller yieldably mounted closely adjacent the face of one of said shearing rollers and in cooperative relation with the other of said shearing rollers, for gripping and supporting the metal sheet closely along one side of the cut made by the shearing rollers.

2. In a machine of the character described, a pair of rotatable, overlapped shearing rollers arranged for slitting sheets of metal delivered thereto, and a strip supporting and feed roller mounted closely adjacent the face of one of said shearing rollers to rotate therewith and in paired relation with the other of said shearing rollers for gripping between them the metal sheet closely along one side of the cut made by the shearing rollers; said strip supporting and feed roller having a resilient mounting whereby it is urged, during rotation, toward the roller that is paired therewith and held tightly against the metal strip cut from the plate.

3. In a machine of the character described, a pair of rotatable, overlapped shearing rollers arranged for slitting sheets of metal delivered thereto, and a strip supporting and feed roller mounted closely adjacent the face of one of the shearing rollers to revolve therewith in peripheral rolling contact with the other of said shearing rollers; said strip supporting roller having a metal rim portion and a resilient mounting body intermediate the rim and its hub portion whereby the roller will be caused to bear against a strip cut from a sheet of metal passed between the rollers closely along one side of the cut.

4. In a machine of the character described, a pair of rotatable, overlapped shearing rollers, and a strip supporting and feed roller mounted coaxially of one of said rollers to rotate therewith and closely adjacent the face of the roller and in peripheral rolling contact with the other of said shearing rollers; said strip supporting roller having a metal rim portion and a resilient body portion whereby the rim is permitted, due to its contact with the shearing roller, to be pressed to a position eccentric of the axis of the adjacent roller and to continuously exert pressure toward the other roller while rotating.

5. In a machine of the character described, a pair of rotatably driven shafts, shearing rollers mounted on said shafts to rotate therewith; said rollers being in overlapped relation and arranged for slitting sheets of metal delivered thereto, and a strip supporting and feed roller mounted on one of the shafts closely adjacent the face of the shearing roller thereon to rotate therewith in rolling contact with the shearing roller of the other shaft; said strip supporting and feed roller having a metal rim of the same outside diameter as the adjacent shearing roller and having a resilient mounting body which permits the roller rim to be displaced eccentrically of the axis and whereby the rim is caused, while rotating, to exert a continuous pressure against the shearing roller that is arranged for rolling contact therewith.

Signed at Los Angeles, California, this 25th day of September, 1928.

ARTHUR D. SUMNER.